United States Patent [19]

Byers

[11] 4,438,089

[45] Mar. 20, 1984

[54] PROCESS FOR OXIDIZING THALLIUM (I) TO THALLIUM (III)

[75] Inventor: Lance R. Byers, East Windsor, N.J.

[73] Assignee: FMC Corporation, Philadelphia, Pa.

[21] Appl. No.: 447,368

[22] Filed: Dec. 6, 1982

[51] Int. Cl.$^3$ ............................................. C01G 15/00
[52] U.S. Cl. ...................................... 423/624; 423/111
[58] Field of Search ......................... 423/111, 592, 624

[56] References Cited

FOREIGN PATENT DOCUMENTS 1100806  1/1968  United Kingdom ................ 423/111

Primary Examiner—Herbert T. Carter
Attorney, Agent, or Firm—Richard E. Elden; Eugene G. Horsky

[57] ABSTRACT

A process was developed using hydrogen peroxide for the oxidation of thallium (I) to thallium (III) in a solvent at a pH of 9.0 or less. Any convenient solvent may be used, such as water, acetic acid, methanol, or a mixture of solvents. Optionally, a buffered solvent may be used.

14 Claims, No Drawings

PROCESS FOR OXIDIZING THALLIUM (I) TO THALLIUM (III)

This invention relates to the oxidation of thallous compounds to thallic compounds.

Oxythallation reactions are well known and described in the literature. These reactions involve the addition of an inorganic thallium (III) salt to an unsaturated organic substance, such as an olefin, acetylene, ketone, or aldehyde. In U.S. Pat. No. 3,641,067, Kruse discloses the use of a thallic carboxylate, such as thallic acetate, to oxidize olefins in an acid solution to the corresponding epoxides. For this process to be practical, it is necessary for an economic method to oxidize thallium (I) to thallium (III) so that thallium values can be recycled.

MacLean et al in U.S. Pat. No. 3,479,262, propose the electrolytic oxidation of an acid solution of thallium (I) sulfate to thallium (III) sulfate and the use of the acidic solution to oxidize olefins. The use of molecular oxygen has been proposed in U.S. Pat. No. 3,399,956; U.S. Pat. No. 4,113,756; U.S. Pat. No. 4,115,419; and U.S. Pat. No. 4,192,814; the use of molecular oxygen generally requires, in addition, the use of catalysts and promoters; and to be economical, the use of high-pressure oxygen. In addition, the molecular oxygen processes usually require high-alloy equipment because of the use of an acidic media in the presence of oxygen.

U.S. Pat. No. 4,115,419 and U.S. Pat. No. 4,115,421 suggest the use of organic hydroperoxide to oxidize an acidic solution of thallium (I) to thallium (III) and have the added requirement of the use of a Group VIII noble metal compound as a catalyst. The organic hydroperoxide processes have the disadvantage of the high cost of the noble metal catalyst; plus the problem of disposing of the organic coproduct formed from the hydroperoxide.

U.S. Pat. No. 4,226,790 suggests the use of an organic peracid to oxidize the thallium (I) to thallium (III). This process not only has the disadvantage of producing an unwanted coproduct, the carboxylic acid, which must be recovered, but also uses a catalyst such as ruthenium, which is very expensive, or manganese, which must be separated from the solutions.

Hill et al, in U.S. Pat. No. 3,436,409, state that thallium (III) can be regenerated by known techniques, ". . . for example chemically, as by reaction with molecular oxygen, hydrogen peroxide and the like, or by electrolytic methods." However, Hill et al do not disclose how hydrogen peroxide can be used for this purpose. The authority for this reference to hydrogen peroxide oxidizing thallium (I) to thallium (III) presumably is based on a literature reference by Rabe, in *Zeit. Anorg. Chem.*, 48, (1906) pages 427 to 440.

Rabe relates that the reaction between elemental thallium with hydrogen peroxide was first described in 1864 by Schönbein who observed that hydrogen peroxide initially oxidizes thallium to a higher oxide; the hydrogen peroxide then reacts with the higher oxide, reducing it with the evolution of oxygen. Rabe found that the extremely insoluble chocolate-brown thallic oxide could be formed in a strongly alkaline solution using a 100 percent excess of hydrogen peroxide. The reaction yield based on thallium was 98 percent in a 4 percent potassium hydroxide solution (pH 13.8); in a 2-½ percent potassium hydroxide solution (pH 10.3) the thallium yield dropped to 81 percent.

In spite of the more favorable oxidation potential of thallium in alkaline solutions compared with acid solutions, the use of such strongly alkaline solutions is undesirable because: (1) the expense of the excess caustic and (2) thallium (III) is generally used in an acid media.

Until now, it was generally accepted that hydrogen peroxide would not oxidize thallium (I) to thallium (III) in an acid media. Bednor, J., "Reaktione von Radikalen in Gegenwart von Thallium (I) Ionen I. Reaction von Eisen (II)-Ionen in Gegenwart von Wasserstoffperoxyd," *Coll. Czeck. Chem. Comm.*, 24, (1959) pages 1240–1249, states that no reaction takes place between thallium (I) and hydrogen peroxide in 0.8 N sulfuric acid.

In accordance with the process of the present invention thallium (I) is oxidized to thallium (III) at a pH of less than 9.

Although it has been confirmed that the reaction of hydrogen peroxide with thallium (I) decreases in efficacy with decreasing pH, as noted by Rabe with the conversion of thallium (I) to thallium (III) approaching zero at pH 10 to 11, it has unexpectedly been found that below pH 9 the conversion of thallium (I) to thallium (III) increases from zero to over 60% at pH 5 when using merely a stoichiometric amount of hydrogen peroxide. Therefore, it is possible to react a thallium (I) salt with hydrogen peroxide at a pH of less than 7 to a thallium (III) salt or to oxidize a thallium (I) hydroxide or oxide to the thallium (III) oxide in the pH range of 7 to 9. It is desirable to use a buffered system to optimize the conversion of thallium (I) to thallium (III). The existence of thallium (III) hydroxide is considered to be unlikely and is, in reality, hydrated thallium (III) oxide.

The oxidation of thallium (I) not only takes place in an aqueous media but also in non-aqueous media and in mixed solvent systems. Examples of non-aqueous solvents of particular interest for organic synthesis include, methanol, acetic acid, and trifluoroacetic acid (TFA). The preferred solvent will depend on the solubilities of the thallium compound used and of the organic compounds in the system; the choice will be obvious to one skilled in the art.

No explanation is available for the oxidation of thallium (I) to thallium (III) at a pH of 9 or less. The reaction mechanism must differ from the known reaction at a pH of 12 or above as the latter reaction has the advantage of both the very low solubility product ($10^{-53}$) of thallium (III) hydroxide to assist the oxidation reaction, as well as a more favorable oxidation potential.

The preferred embodiments of this process will be evident to one skilled in the art from the following non-limiting examples.

EXAMPLE 1

Run No. 1—A solution was prepared containing 2.524 grams (5 millimols) of thallous sulfate in 100 milliliters of water. The solution was adjusted to pH 2.5 using concentrated sulfuric acid (96%). The stoichiometric amount, 0.486 grams, of 70% hydrogen peroxide was added and the solution was stirred for 17 hours. The percent conversion to thallic oxide was determined and is reported in Table I.

Run No. 2 through Run No. 20—Run No. 1 was repeated except for the reaction time and the pH of the solution. Either sodium hydroxide or potassium hydroxide (60%) was used instead of sulfuric acid above pH 7. The pH, the reaction time in hours, and the percent conversion are reported in Table I. Hydrogen peroxide was found to be still present in the solution at the completion of the time specified in Runs 1 through 7; a precipitate was observed at pH 10 and above.

EXAMPLE 2

Solutions were prepared containing 2.5 grams of thallous hydroxide monohydrate (0.01 mol, TlOH.H$_2$O) and a solvent system of acetic acid, trifluoroacetic acid, and water. One-quarter of the stoichiometric amount of hydrogen peroxide (95 μl H$_2$O$_2$ 70%) was added at the beginning of the run and again after 1, 2, and 3 hours. The thallium (III) in the solution was determined at 3 hours, just before the final hydrogen peroxide addition, and generally after 4 hours. The data are reported as Table II.

EXAMPLE 3

Two solutions were prepared, each containing 0.27 g (1 millimol) thallium nitrate in 50 milliliters methanol at 50° C. The apparent pH of the first was determined with a pH meter and found to be 2; the pH of the second was adjusted to 4 with 0.5 N sodium methylate. Hydrogen peroxide (70%) was added to each in four 0.25 millimol portions at one-half hour intervals. Immediately prior to the hydrogen peroxide addition, the unoxidized thallium was determined by iodate titration and the results are reported in Table III.

TABLE I

Effect of pH on the Oxidation of Thallium with Hydrogen Peroxide

| Run No. | pH | Time (Hrs.) | % Conversion Tl (III) |
|---|---|---|---|
| 1 | 2.5 | 17.00 | 42.6 |
| 2 | 2.5 | 17.00 | 54.4 |
| 3 | 2.5 | 24.00 | 37.6 |
| 4 | 5.0 | 22.25 | 58.0 |
| 5 | 5.0 | 22.25 | 62.3 |
| 6 | 5.0 | 95.00 | 47.6 |
| 7 | 5.0 | 95.00 | 40.7 |
| 8 | 7.0 | 1.00 | 22.5 |
| 9 | 7.0 | 22.00 | 22.5 |
| 10 | 9.0 | 4.50 | 16.8 |
| 11 | 10.0 | 4.50 | 0.0 |
| 12 | 10.0 | 4.50 | 0.0 |
| 13 | 10.0 | 4.50 | 5.5 |
| 14 | 10.0 | 24.00 | 3.7 |
| 15 | 10.0 | 24.00 | 3.7 |
| 16 | 10.0 | 24.00 | 3.8 |
| 17 | 11.0 | 19.00 | 2.9 |
| 18 | 13.0 | 19.00 | 39.8 |
| 19 | 14.0 | 19.00 | 59.7 |
| 20 | 15.0 | 1.50 | 75.9 |

TABLE II

Thallium (I) Oxidation with Hydrogen Peroxide in Organic Media

| Run | Water | CH$_3$COOH | CF$_3$COOH | CH$_3$COONa | % Conversion Tl (III) after: 3 hours | 4 hours |
|---|---|---|---|---|---|---|
| 1 | — | 100.0 | — | — | 50 | 75 |
| 2 | — | 95.0 | — | 5.0 | 52 | 72 |
| 3 | 10.0 | 90.0 | — | — | 45 | 65 |
| 4 | 9.5 | 85.5 | — | 5.0 | 50 | * |
| 5 | — | — | 100.0 | — | 32 | 55 |
| 6 | — | — | 90.0 | 10.0 | 35 | 65 |
| 7 | 10.0 | — | 90.0 | — | 60 | 70 |
| 8 | 9.5 | — | 85.5 | 10.0 | 65 | * |

*Not determined

TABLE III

Thallium (I) Oxidation by 70% Hydrogen Peroxide in Methanol at 50° C.

| Time Hours | % Conversion pH 2 | pH 4 |
|---|---|---|
| 0.5 | 0.0 | 24.7 |
| 1.0 | 53.3 | 53.3 |
| 1.5 | 61.5 | 81.8 |
| 2.0 | 81.8 | 81.8 |
| 2.5 | 76.7 | 73.0 |

What is claimed is:

1. A method of oxidizing a thallous compound to a thallic compound consisting essentially of reacting the thallous compound with hydrogen peroxide in a solvent at a pH of less than 9.

2. The method of claim 1 wherein the thallous compound is a thallous salt, the solvent is water, and the pH of the solvent is between 2 and 7.

3. The method of claim 1 wherein the solvent is acetic acid.

4. The method of claim 1 wherein the solvent is trifluroacetic acid.

5. The method of claim 1 wherein the thallous compound is thallous hydroxide, the solvent is water, and the pH is between 7 and 9.

6. The method of claim 1 wherein the solvent is methanol.

7. The method of claim 1 wherein solvent is a mixture of two or more liquids.

8. The method of claim 1 wherein the solvent contains a buffer.

9. The method of claim 2 wherein the solvent contains a buffer.

10. The method of claim 3 wherein the solvent contains a buffer.

11. The method of claim 4 wherein the solvent contains a buffer.

12. The method of claim 5 wherein the solvent contains a buffer.

13. The method of claim 6 wherein the solvent contains a buffer.

14. The method of claim 7 wherein the solvent contains a buffer.

* * * * *